Nov. 17, 1936. G. H. CURTISS Re. 20,171

MOTOR VEHICLE

Original Filed July 9, 1929

Inventor

Glenn H. Curtiss, Deceased,
Lena P. Wheeler, Assignee,

By Stone, Boyden & Mack,
Attorneys

Reissued Nov. 17, 1936 Re. 20,171

UNITED STATES PATENT OFFICE 20,171

MOTOR VEHICLE

Glenn H. Curtiss, deceased, late of Country Club Estates, Fla., by Lena P. Wheeler, assignee, Miami Springs, Fla.

Original No. 1,948,744, dated February 27, 1934, Serial No. 376,985, July 9, 1929. Application for reissue January 31, 1936, Serial No. 61,822

36 Claims. (Cl 180—11)

This invention relates to motor vehicles, and more particularly to a coupling or suspension means for the bodies thereof whereby vibration is greatly reduced.

As ordinarily constructed, the motor and the body of a passenger automobile are mounted on the same rigid frame or chassis, and with such an arrangement the passengers are subjected to all of the shocks and vibration incident to the operation of the power plant, as well as to road shocks.

An object of the present invention is to provide a construction which shall effectually prevent such transmission of shocks and vibration from the power plant to that part of the vehicle occupied by passengers, so that while the vehicle may be controlled and steered from the passenger compartment in the usual way, the occupants will be conveyed as smoothly as though rolling along without any propelling power.

Another object is to lessen the effect on the automobile body of shocks due to irregularities of the road, by providing special means for absorbing such shocks.

To this end, it is proposed to construct the body and the propelling and steering mechanism as two separate units, and to connect these units wholly by yieldable coupling members or cushions, preferably of annular form, so that neither road shocks nor the vibrations set up in the power unit will be transmitted to the body unit. It is further proposed to connect the power plant to the steering wheels in such manner that the reaction vibrations set up by the motor will be transmitted directly to such wheels.

The herein described construction serves to further reduce road shocks because it provides a yielding truss between the front and rear ends of the vehicle. One reason that this yieldability is permissible in the vehicle of the present invention is due to the fact that the motor is located at that end of the vehicle where the power is applied to the wheels. On the other hand the yieldable feature might not be so desirable in a structure where the engine is at one end of the body and the driven wheels are at the opposite end because the transmission mechanism and the propeller shaft might be unduly strained by relative movement between the engine and the wheels.

Specifically, it is proposed to mount the power plant wholly upon the two front wheels of the vehicle, and to support one end of the body on this two wheeled power unit by coupling devices of the above character arranged so that they will prevent the transmission of vibrations, and permit relative transverse oscillating or teetering movement, and at the same time will form a directionally stable connection between the two units, whereby the power unit may be controlled from the body unit.

The invention further specifically contemplates the provision of a transverse board secured to the body unit, and rigid arms projecting forwardly from such board and connected through resilient coupling means with said power plant, whereby slight relative movement between said body unit and power plant is permitted.

In order that the invention may be clearly understood, reference is had to the accompanying drawing, forming part of this specification, and illustrating the invention more or less conventionally, in which drawing.

Figure 1:
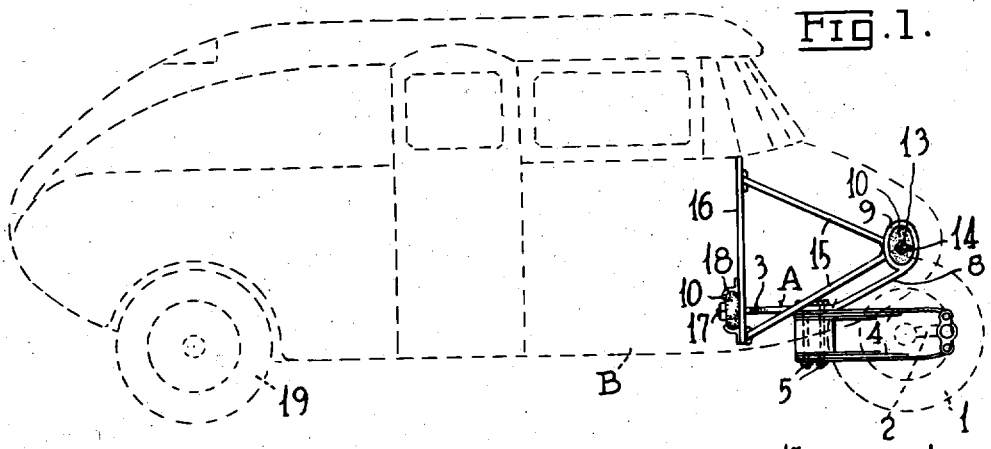
Figure 1 is a side elevation showing in dotted lines the outline of a motor vehicle, and in full lines the improved means for coupling the power unit and the body unit.
Figure 2:
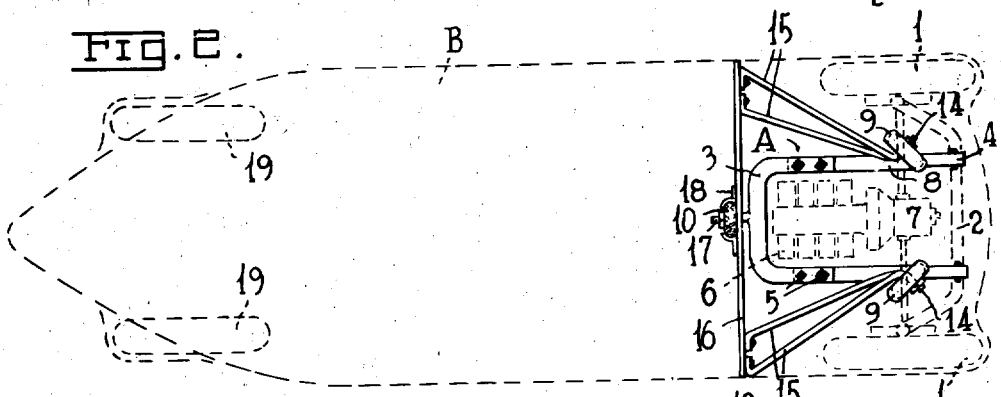
Figure 2 is a plan view thereof.
Figure 5:
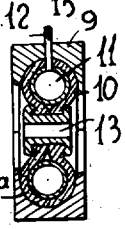
Figure 5 is a vertical transverse section on an enlarged scale, through one of the improved coupling members, embodying a pneumatic tube.

Referring to the drawing in detail, and more particularly to Figures 1, 2 and 5, the front truck or power unit of the vehicle is indicated in its entirety at A and the body unit is shown in dotted lines at B.

The power unit comprises a pair of front supporting and driving wheels 1 mounted at the ends of a suitable axle 2. A U-shaped motor supporting frame 3 constituting part of the power unit, has secured to the ends thereof, as by means of bolts 5, pairs of quarter elliptic springs 4, the free ends of which are secured to the axle 2 in any suitable way.

The motor itself, which may be of any suitable type, is shown in dotted lines at 6 as suitably supported by the frame 3, and may be arranged to transmit power to a differential 7, from which extend the usual live axles to the wheels 1. It will be understood, however, that the details of arrangement of the motor and transmission and driving mechanism form no part of the present invention, except so far as concerns the supporting frame 3. As clearly shown in Fig. 2, this frame comprises a substantially transverse end portion and a pair of spaced side portions which embrace the motor.

Secured to the end of each side portion of the frame 3, either by bolts or by being formed integral therewith, is an upwardly and forwardly extending member 8, carrying at its free end a circular rim element 9, having an internal concave seat 9a, as clearly shown in Figure 5. Enclosed within this rim element 9 is a pneumatic cushion member, shown in Figure 5 as in the nature of an ordinary tire shoe or casing 10 having enclosed therein an inner tube 11 provided with an inflation valve 12.

Fitted in the center of this annular pneumatic cushioning device is a hub or socket element 13, having an axial bore. In this bore or socket is received a stud or pin 14, carried at the meeting ends of a bifurcated frame member 15. The bars or legs of this frame member diverge rearwardly and are secured at their ends to vertically spaced, widely separated points of a transverse, substantially vertical, relatively deep plate, board or frame 16 carried by and forming a part of the body unit, and extending a substantial distance above the bottom of the body, thus providing at each side of the vehicle a triangulated framework constituting a forwardly tapering rigid cantilever or supporting arm. These two arms converge forwardly, and not only do they, when taken together, constitute a generally pyramidal arrangement, but also each arm, in combination with the members 3 and 8, and stud 17, forms a pyramidal structure. It will be observed that the annular cushioning devices 10 and rims 9, above described, are disposed in a vertical plane, and are shown as lying at an angle to the axis of the vehicle. This is merely for convenience, in making the connections shown. Other arrangements and dispositions of these coupling devices can readily be employed without departing from the spirit of the invention.

Extending rearwardly from the end portion of the frame 3 is a trunnion or stud 17. This fits in the socket member 18 of a third annular cushioning member 19, such member being carried by the rim elements or lugs 18 secured to the plate or frame 16, it being understood, of course, that the plate 16 is cut away where the stud 17 passes through it, so as to permit free relative movement of said stud and plate.

From the foregoing, it will be seen that there is provided what may be called a three-point connection between the power unit and the body unit, this connection comprising three spaced yielding coupling members arranged in triangular relation. It will be noted that at each one of these three points, an annular cushioning member is interposed between an element carried by the power unit and a cooperating element carried by the body unit, and that these yieldable couplings or cushioning members constitute the sole connection between the power unit and the body unit. It will thus be obvious that vibrations set up in the power unit are absorbed by the cushioning devices, and are therefore not transmitted to the body unit.

It will further be noted that the motor supporting frame 3, which forms part of the power plant, is resiliently connected at its front ends to the axle 2, by springs 4, and is itself thus partially supported by the vehicle wheels 1. It is movably or pivotally supported at its rear end on the board 16 by means of the stud 17, the vibration-absorbing cushion 19 being interposed between such board and frame. Since the power plant is connected at each side directly with the front axle, it follows that the reaction vibrations of the motor are transmitted to and sustained by the wheels themselves. And finally, the entire power unit is further connected with the body unit by means of the spaced cushions 10, at the forward ends of the arms 15, which are carried wholly by and project from the board 16, and which also serve to partially support the power plant or motor.

It will also be seen that the coupling members described provide a readily detachable connection between the two units. All that is necessary is to remove or disengage the studs 14 from the sockets of the respective coupling devices 10, when the two units may be immediately separated by moving one longitudinally of the other, thus disengaging the stud 17 also.

It will be further apparent that by means of these yielding coupling devices, not only is tractive effort transmitted from the power unit to the body unit, but the latter is supported on the former, in a directionally stable manner.

In fact, each unit, which is itself unstably mounted on two or more road wheels, serves to support the other, and while the yielding couplings above described provide a directionally stable connection between the units, they permit relative transverse or teetering movement, so that shocks due to irregularities of the road are not transmitted to the body.

This shock absorbing characteristic is due in part to the mass or inertia of the motor and associated parts. This mass, which acts as a shock dampener, is carried on springs, and on the usual pneumatic tires, these elements constituting primary and secondary shock absorbing means. The above described yielding cushions or coupling devices constitute tertiary shock absorbing means, and these, it will be seen, are disposed between the power unit and the body unit, and are in addition to the springs and tires and provide a cushioning effect of the same order of magnitude. Thus, before reaching the body, road shocks must pass in series through the tires, springs, mass of the motor, and the yielding coupling devices, this fact greatly increasing the smooth riding qualities of the improved vehicle. It may be pointed out that while the above has reference to wheel shocks in transverse planes, the tertiary cushioning devices are equally effective in absorbing shocks in a longitudinal plane. This is due to the fact that the annular cushioning devices are in the nature of universal joints, permitting limited relative movement in any direction whatsoever.

It will be observed that, in the above described arrangement, two of the cushioning devices lie in substantially the same vertical transverse plane as the axle of the power unit. These yield sufficiently to permit transverse teetering in the same manner as do the wheel tires and springs. The third cushioning device is disposed in the longitudinal plane of symmetry of the vehicle, the trunnion 17 freely permitting the foregoing teetering action, the same as if the power unit were pivoted on a longitudinal axis.

The body unit itself may be of any desired type or construction, and is supported at the rear on its own wheels 19, any desired springs being interposed between such wheels and the body. It will be further understood that a driver's seat is arranged at the front of the body unit, and that the power unit can be controlled from this seat by any suitable means (not shown).

Figure 3:
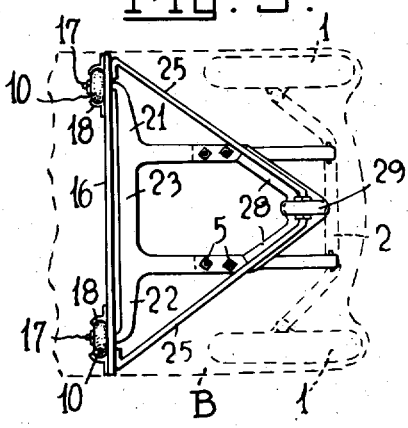
Figures 3 and 4 are fragmentary views corresponding respectively to Figures 2 and 1, and showing a slightly modified arrangement of coupling means.
Figure 4:
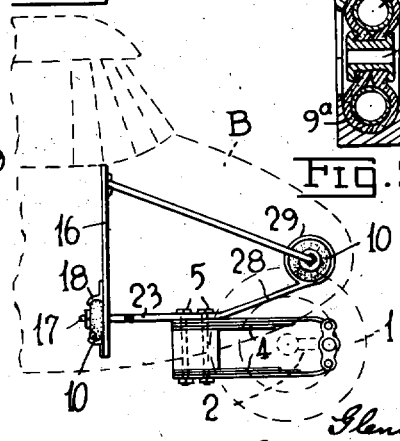

In Figures 3 and 4, there is shown a slightly modified method of providing the above mentioned three-point connection, between the power unit and the body unit. In these figures, there is illustrated a bifurcated member 28 secured to the motor supporting frame 23 of the power unit, and carrying at its forward end a rim element 29. Instead of the two bifurcated frames 15, shown in Figure 1, there is employed in the present modification a single bifurcated or triangular frame 25, the apex of which passes through the socket member corresponding to the rim element 29, the ends of the frame 25 being secured to the plate or frame 16.

Instead of a single stud 17, as in Figure 1, there is employed in Figures 3 and 4 a pair of such studs, spaced widely apart horizontally and carried at the ends of arms 21 and 22, extending from the frame 23, and constituting therewith a transverse member parallel with the plate or dash 16. Rim elements or lugs 18 are provided adjacent each stud 17, as before, and cushions 19 are interposed between each stud and the respective rim elements. Thus the transverse plate or board 16 and the transverse motor supporting frame 21, 22, 23 are connected at a plurality of points, with vibration-absorbing cushion means interposed between them at each point. And the fact that the connection points are widely separated, as described, lends transverse stability to the structure.

It is clear that with this arrangement, there is likewise formed a three-point connection, two of the points being at the rear and one in front, this arrangement being the reverse of that shown in Figure 2, in which two points of connection are disposed at the front and a single point at the rear. Other modifications will no doubt suggest themselves to those skilled in the art.

In this arrangement of Figures 3 and 4, it will be observed that two of the yielding coupling devices lie as before substantially in the same transverse vertical plane, and the third is disposed in the longitudinal plane of symmetry of the vehicle, thus giving rise to the same advantages as previously described.

Furthermore, with either arrangement of three-point suspension, shock movement occurring at any one point serves to oscillate the power unit about the other two, relative to the body unit.

Finally, in both modifications, it will be noted that some, at least, of the yielding couplings or cushioning devices are located well above the motor and front axle, thus giving increased stability.

Figure 6:
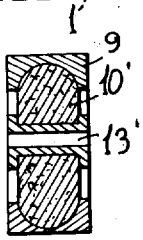
Figure 6 is a similar view of a coupling embodying a solid annulus of rubber or similar elastic material.

Instead of employing a pneumatic cushioning device, as shown in Figure 5, one may use the cushioning device illustrated in Figure 6, in which, instead of the pneumatic tube 10, there is shown a solid annulus 10', of rubber, or similar elastic material, having a socket member 13' fixed therein.

While there is illustrated and described certain more or less specific constructions, it will be understood that these have been shown only for the purpose of illustrating the principle of the invention, namely, the provision of separable body and power units and the complete insulation of the power unit from the body unit, so far as any rigid connection is concerned. Many other embodiments may obviously be made, without departing from the spirit of the invention or the scope of the appended claims.

What is claimed is:

1. In a motor vehicle, a body unit and a two-wheeled power unit having an axle, and a plurality of spaced yieldable coupling members constituting the sole connection between said units, all of said members lying above said axle, and some being disposed in the same transverse plane.

2. In a motor vehicle, a body unit and a two-wheeled power unit, a three-point connection between said units, and a cushion interposed between the respective elements at each connection point, and yieldable in all directions.

3. In a motor vehicle, a body unit and a power unit, each having two wheels, and means for connecting said units so that they support each other, said connecting means comprising a rim element carried by one unit, a hub or socket element carried by the other unit, and an annular cushioning member interposed between said elements and disposed in a vertical plane.

4. A passenger automobile comprising separable body and power units, each unstably supported on wheels, vehicle springs and wheel tires constituting primary and secondary shock absorbing means in connection with said power unit, and tertiary shock absorbing means of the same order as said tires and springs interposed between said power unit and body unit and constituting the sole means for connecting the one with the other.

5. An automobile comprising a body unit, a power unit unstably road mounted on wheels and deriving its stability through connection to the body unit, said power unit comprising a motor and springs by which said motor is supported on said wheels, and a shock absorbing stabilizing and tractive connection, exclusive of said springs between the body unit and power unit through which the power unit partakes of movement independently of and prior to the body unit, as such movement is induced by road shocks.

6. A passenger automobile comprising a body unit and a power unit, which latter includes a motor and springs on which said motor is supported, said power unit being unstably road mounted on wheels and deriving its stability through connection with the body, and shock absorbing stabilizing and traction connecting means between the power unit and the body unit independent of said springs and having the shock absorbing qualities of a pneumatic automobile tire.

7. An automobile comprising body and power units independently road supported, said power unit being unstably supported and comprising a motor, wheel tires and axle suspension springs, said tires and springs shock absorbing the power unit per se, and a tertiary shock absorbing connection exclusive of said springs and of an order of magnitude approaching the tires and the springs interposed between the power unit and the body unit, whereby such shocks as pass the tires and the springs are damped in large part by the inertia of the motor and are absorbed altogether in said tertiary means.

8. A passenger automobile comprising a body unit and a power unit independently and unstably road supported, and shock absorbing and stabilizing couplings constituting the sole connection between the power unit and the body unit affording longitudinal directional stability between the units but substantially freely permitting limited relative transverse movement between the units.

9. In a motor vehicle, a body unit and a power unit independently and unstably road supported, said power unit comprising a motor, an axle carrying driving wheels, and springs supporting said motor on said axle, and a plurality of yieldable coupling means, independent of said springs, for transmitting tractive effort from said power unit to said body unit, and for supporting the latter on the former, said means constituting the sole connection between said units.

10. In a motor vehicle, a body unit and a two wheeled power unit having an axle, a motor, and springs by which the motor is suspended from said axle, and means independent of said springs for connecting said units, said connecting means comprising a plurality of spaced, yieldable coupling members.

11. In a motor vehicle, a body unit and a two wheeled power unit having an axle, a motor, and springs by which the motor is suspended from said axle, and means independent of said springs for supporting said body unit on said power unit and comprising a plurality of spaced, yieldable coupling members.

12. In a motor vehicle, a body unit and a two wheeled power unit having an axle, a motor, and springs by which the motor is suspended from said axle, and means independent of said springs for supporting said body unit on said power unit and comprising a plurality of spaced, yieldable coupling members, said coupling members constituting the sole connection between said units.

13. An automobile comprising body and power units, independently road supported, said power unit being unstably supported and comprising wheels and axle and a motor spring-suspended from said axle, and relatively large shock-absorbing stabilizing connections, independent of such spring suspension, interposed between the power unit and the body unit.

14. A motor vehicle comprising a rear body unit having a transverse member at its forward end, a front power unit comprising a power plant and the front vehicle wheels, and having at its rear end a transverse member forming part of the power unit, and located forwardly of said first transverse member and direct connections including vibration-absorbing cushion means between said two transverse members, portions of such cushioned connections being disposed at points spaced relatively far apart horizontally, to afford transverse stability.

15. A motor vehicle comprising a rear body unit having a transverse member at its forward end, a front power unit comprising a motor and the front vehicle wheels, and having at its rear end a transverse member located forwardly of said first transverse member forming part of the motor support, and a plurality of spaced, cushioned connecting means directly between said two transverse members.

16. A motor vehicle having a transverse member in the form of a substantially vertical board, a power plant in front of said board, and rigid arms carried by and secured to said board at vertically spaced points on opposite sides of the vehicle, said arms projecting forwardly from said board and having at their end means resiliently connected with said power plant.

17. A motor vehicle having a transverse member, and a power plant including a motor and a supporting frame, said frame comprising a transverse portion substantially parallel with said member and having cushioned engagement therewith at a plurality of points, and also comprising a pair of spaced portions carried by and projecting forwardly from said transverse portion adjacent the opposite sides of the vehicle.

18. In a motor vehicle, a body unit, and a separable power unit attached to said body unit, said power unit comprising a pair of driving wheels and a power plant connected therewith, a transverse board member adjacent the junction of said units, means for pivotally connecting the rear end of said power plant with said board, and means for resiliently supporting said power plant from said board at a point spaced well forward of said board.

19. In a motor vehicle, a body unit, and a separable power unit attached to said body unit, said power unit comprising a pair of driving wheels and a power plant connected therewith, a rigid transverse member adjacent the junction of said units, means for movably and resiliently supporting the rear end of said power plant on said member, and means rigidly carried wholly by said member and resiliently connected with said power plant at a point adjacent the vertical plane of the centers of said wheels.

20. In a motor vehicle, a body unit, and a separable power unit attached to said body unit, said power unit comprising a pair of driving wheels and a power plant connected therewith, a transverse board member adjacent the junction of said units, means for pivotally supporting the rear end of said power plant on said member, a rigid frame carried wholly by said member and projecting forwardly therefrom, and a resilient connection between the forward end of said frame and said power plant.

21. In a motor vehicle having a body and a power plant at the front end thereof, a transverse substantially vertical board member secured to said body, means for movably supporting the rear end of said power plant on said member, a rigid arm structure connected to said board member at widely separated vertically spaced points and projecting forwardly therefrom, and means for supporting said power plant at the forward end of said arm structure.

22. In a motor vehicle having a body and a power plant at the front end thereof, a transverse substantially vertical board member secured to said body, means for movably supporting the rear end of said power plant on said member, a rigid triangulated framed structure comprising a plurality of forwardly converging bars supported wholly by and projecting from said board member, and means at the apex end of said structure engaging said power plant.

23. A vehicle having a dash, a transverse member carried by said dash and having non-metallic means through which it engages said dash at a plurality of spaced points, and a motor support comprising spaced forwardly-projecting members carried by said member adjacent the opposite sides of the vehicle.

24. A vehicle having a transverse, substantially vertical board, a transverse member carried by said board and having means by which it is attached thereto at a plurality of points, and a motor support comprising spaced, forwardly projecting members carried by said member adjacent the opposite sides of the vehicle.

25. A motor vehicle having a transverse member, and a power plant including a motor and a supporting frame, said frame comprising a transverse portion substantially parallel with said member and attached thereto at a plurality of points, and a pair of spaced portions carried by and projecting forwardly from said transverse portion adjacent the opposite sides of the vehicle.

26. A motor vehicle having a substantially vertical, continuous, transverse plate-like frame adjacent one end thereof extending from the bottom of the vehicle body a substantial distance above the same, a motor supported beyond said frame, means for supporting the motor at least in part comprising cantilever structures of generally triangular form in both elevation and plan extending longitudinally of the vehicle on opposite sides of the motor and secured to said frame at least at points adjacent the top and bottom thereof.

27. A motor vehicle having a transverse frame adjacent one end thereof, a motor supported beyond said frame, the support for said motor in part at least comprising cantilever structures of generally pyramidal form extending longitudinally of the vehicle and lying on opposite sides of the motor, said pyramidal structures being secured by their bases to said frame.

28. A motor vehicle having a transverse frame adjacent one end thereof, a motor supported beyond said frame, the support for said motor in part at least comprising cantilever structures of generally pyramidal form extending longitudinally of the vehicle and lying on opposite sides of the motor, said pyramidal structures being secured by their bases to said frame, and such bases having at least one point in common.

29. An automobile chassis comprising a rear section having a vertical plate at its front end and with engine supporting means projecting forwardly from and supported wholly by said plate and having an engine mounted thereon.

30. A vehicle having a vertical dash, opposite front road wheels, and means secured to the front of the dash at a plurality of spaced points and supporting the weight of the vehicle at its front end and including spring means transmitting such weight to said wheels.

31. A vehicle having a vertical dash, opposite front road wheels, a pair of forwardly projecting arms stably mounted on the front of the dash and supported at spaced points on said dash, and said arms supporting the weight of the vehicle at its front end through spring means connected to said wheels.

32. A vehicle having a vertical dash and forwardly projecting arms mounted on the front of the dash and spaced apart thereon, said arms supporting the weight of the vehicle at its front end, and a power plant arranged between said arms and supported at one end by the dash, and means supporting the other end of said power plant.

33. A motor vehicle having near its forward end a transverse member, a power plant in front of said member, and rigid arms secured directly to and carried by said transverse member on opposite sides of the vehicle, said arms projecting and converging forwardly from said member, and having at their ends means connected with said power plant.

34. In a motor vehicle having a body, and a power plant at one end thereof, a transverse, substantially vertical board member secured to said body, means for movably supporting one end of said power plant on said member, a rigid arm structure connected to said board member at widely separated, vertically spaced points and projecting therefrom longitudinally of the vehicle, and means for supporting said power plant at the free end of said arm structure.

35. In a motor vehicle having a body, and a power plant at one end thereof, a transverse, substantially vertical board member secured to said body, means for supporting one end of said power plant on said member, a pair of rigid arm structures carried by said board member and projecting therefrom longitudinally of the vehicle adjacent the opposite sides thereof, each of said arm structures being connected to said board member at widely separated, vertically spaced points, and means at the free ends of said arm structures for supporting said power plant.

36. A vehicle having a transverse, substantially vertical board, a transverse member carried by said board and having means by which it is attached thereto at a plurality of points, and a motor support comprising spaced members carried by and projecting from said member longitudinally of the vehicle adjacent the opposite sides thereof.

LENA P. WHEELER,
*Assignee of Glenn H. Curtiss, Deceased.*